United States Patent
Brief et al.

(10) Patent No.: US 6,205,501 B1
(45) Date of Patent: Mar. 20, 2001

(54) APPARATUS AND METHOD FOR HANDLING UNIVERSAL SERIAL BUS CONTROL TRANSFERS

(75) Inventors: David Brief, Ra'anana (IL); David J. Fensore, New Gloucester, ME (US); Kent Bruce Waterson, South Portland, ME (US); Gregory Lewis Dean, Standish, ME (US)

(73) Assignee: National Semiconductor Corp., Santa Clara, CA (US)

( * ) Notice: Subject to any disclaimer, the term of this patent is extended or adjusted under 35 U.S.C. 154(b) by 0 days.

(21) Appl. No.: 09/004,002

(22) Filed: Jan. 7, 1998

(51) Int. Cl.[7] ................................................ G06F 13/00
(52) U.S. Cl. ......................... 710/100; 710/56; 710/129; 710/110
(58) Field of Search ........................... 710/62, 63, 100, 710/53, 56, 105, 106, 107, 110, 126, 129

(56) References Cited

U.S. PATENT DOCUMENTS

| | | | |
|---|---|---|---|
| 5,729,721 | 3/1998 | Bettelheim et al. ................. | 395/557 |
| 5,751,951 | 5/1998 | Osborne et al. ................... | 395/200.8 |
| 5,778,218 | 7/1998 | Gulick .............................. | 710/60 |
| 5,818,948 | 10/1998 | Gulick .............................. | 381/77 |
| 5,835,791 | 11/1998 | Goff et al. ........................ | 710/62 |
| 5,841,471 | 11/1998 | Endsley et al. ................... | 348/231 |
| 5,848,293 | 12/1998 | Gentry ............................. | 710/5 |
| 5,875,351 | 2/1999 | Riley ............................... | 395/842 |
| 5,901,332 | 5/1999 | Gephardt et al. ................. | 710/41 |
| 5,911,152 | * 6/1999 | Wooten ............................ | 711/208 |
| 5,933,611 | * 8/1999 | Shakkarwar ..................... | 710/126 |
| 5,974,486 | * 10/1999 | Siddappa ......................... | 710/53 |
| 5,987,530 | * 11/1999 | Thomson ......................... | 710/4 |

OTHER PUBLICATIONS

USB Feature Specification: Shared Endpoints; SystemSoft Corporation, Intel Corporation; pp. i–iii, 1–14; Dec. 4, 1997.
Universal Serial Bus Common Class Specification; SystemSoft Corporation, Intel Corporation; pp. i–v, 1–14; Nov. 4, 1997.
Universal Seril Bus Specification; Compaq, Digital Equipment Corporation, IBM PC Company, Intel, Microsoft, NEC, Northern Telecom; pp. 1–268; Jan. 15, 1996.
8x930Ax, 8x930Hx Users Manual; Intel; pp. 6.1–10.1 Appendix B–D; 1997.

\* cited by examiner

Primary Examiner—Robert W. Beausoliel, Jr.
Assistant Examiner—X. Chung-Trans
(74) Attorney, Agent, or Firm—Limbach & Limbach LLP (57) ABSTRACT

A method and apparatus for performing a control transfer on a Universal Serial Bus (USB) device. A USB device includes a memory space for reading and writing data transmitted over a USB network. The memory space is shared between a plurality of endpoints. A host initiates a control transfer by transmitting a SETUP token to a first endpoint. The endpoint must accept the SETUP token. If the first endpoint does not expect the SETUP token, or if another endpoint is active, the device stores the token until a buffer is allocated and the first endpoint is made active.

18 Claims, 7 Drawing Sheets

APPARATUS AND METHOD FOR HANDLING UNIVERSAL SERIAL BUS CONTROL TRANSFERS

BACKGROUND OF THE INVENTION

1. Field of the Invention

The present invention relates to an apparatus and method for performing a control transfer over a Universal Serial Bus and, in particular, to responding to setup, data, and status transactions of a control transfer.

2. Description of the Related Art

Universal Serial Bus (USB) is a standard peripheral interface for attaching personal computers to a wide variety of devices: e.g., digital telephone lines, monitors, modems, mice, printers, scanners, game controllers, keyboards, and other peripherals. A USB thus replaces existing interfaces such as the RS-232C serial ports, parallel ports, PS/2 interface and game/MIDI ports.

In accordance with USB, all attached devices connect to a personal computer through a single connector type using a tiered-star topology. A host personal computer includes a single USB controller. The host controller provides the interface between the USB network and the host personal computer. The host controller controls all accesses to USB resources and monitors the bus's topology. A USB hub provides USB attachment points for USB devices.

Figure 1:
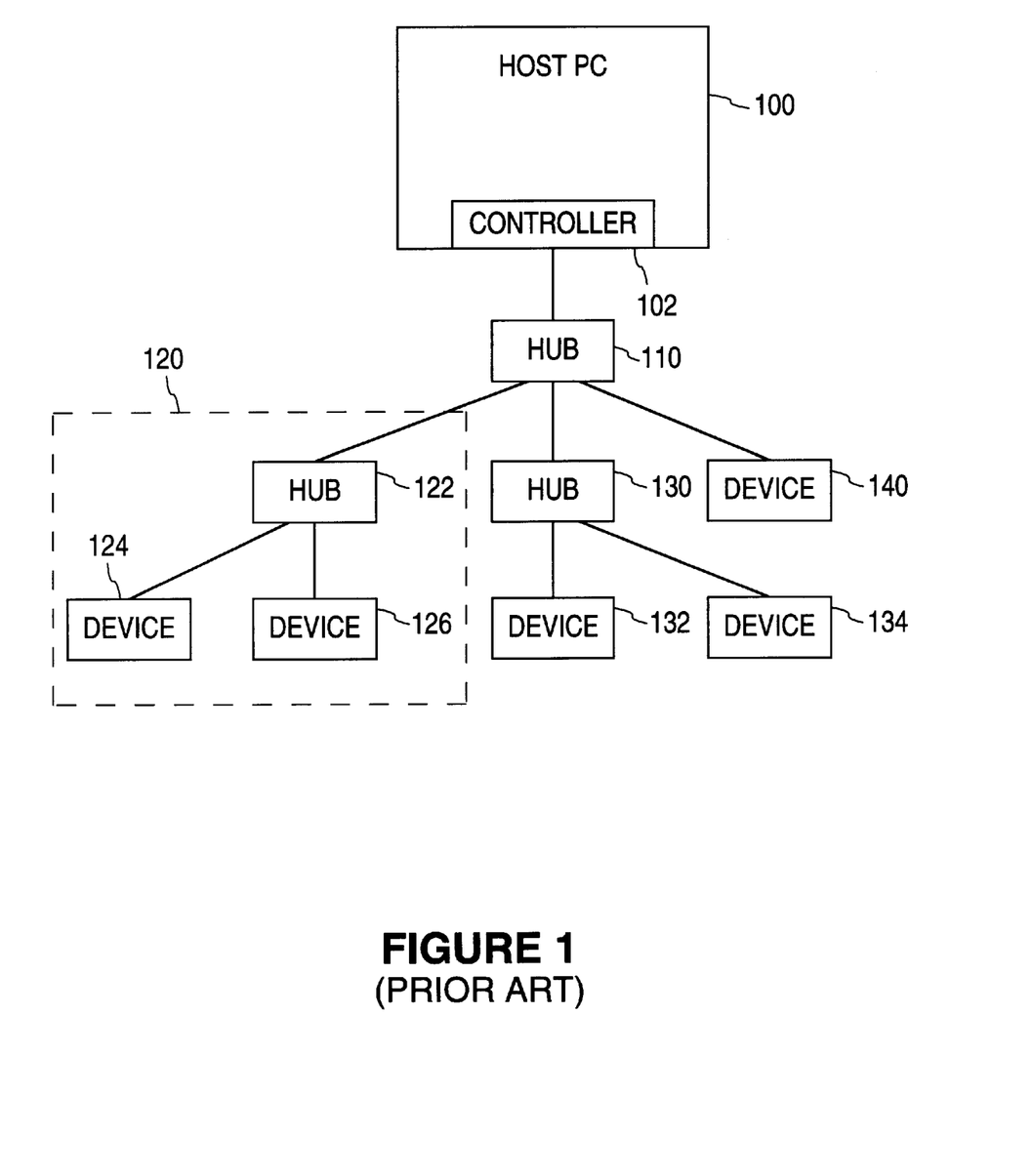
FIG. 1 is a block diagram of a Universal Serial Bus network.

An example of the tiered-star topology of a USB network is shown in FIG. 1. Host PC 100 is a typical personal computer having a USB port connection via host controller 102. Host controller 102 connects directly to root hub 110, which is typically implemented as part of the Host PC 100. Compound device 120, hub 130, and device 140 connect to the host controller 102 through root hub 110. Devices 132 and 134 connect to the host controller 102 through hub 130 and through hub 110.

Compound device 120 includes devices 124, 126 and hub 122. Hub 122 of compound device 120 connects to the host controller through hub 110. Devices 124 and 126 of compound device 120 connect to the host controller 102 through hub 122 and through hub 110. A practical example of a compound device would be an integrated printer and fax. The printer could be device 124, and the fax could be device 126.

The tiered-star topography illustrated in FIG. 1 allows data to be transmitted into and out of the host PC 100 to the various devices. When data is transmitted from the host to a device, it is transmitted downstream through the interconnecting hubs. When data is transmitted from a device to the host, it is transmitted upstream through the interconnecting hubs.

The USB hubs and devices may be connected and disconnected without completely re-starting the USB network. Upon connection of a device or hub to an upstream hub, the upstream hub will notify the host controller of a change in status. Following USB protocol, the host controller will enable the port of the hub to which the device is connected. The host controller will then assign a unique functional address to each device. Ports are enabled one at a time as the host controller 102 assigns unique functional addresses. Upon connection of a compound device, the host controller assigns a unique functional address to each device contained within the compound device. Returning to FIG. 1, devices 124, 126, 132, 134, and 140 along with hubs 110, 122 and 130 will each be assigned a unique functional address upon connection to the USB network.

A USB Function is a USB device that is able to transmit and receive information on the bus. A Function may have one, or more, configurations, each of which defines the interfaces which make up the device. Each interface, in turn, is made up of one of more endpoints.

An endpoint is the ultimate source, or sink, of data. An endpoint pipe provides for the movement of data between the USB and memory, and completes the path between the USB Host and the function endpoint. A USB device may support up to 16 such endpoint pipes at any given time. Each endpoint pipe will have the same functional address.

At initialization of a device, the host controller associates a pipe with the endpoint functions. The pipes allow the host controller to move data into and out of a host memory buffer to and from the endpoints. The USB implements two types of pipe communication modes: stream and message. Stream data does not have a defined USB structure. Message data does have a defined USB structure.

At initialization, a pipe is assigned a claim on USB bus access and bandwidth usage. This assignment will determine priority for transmitting data over a particular pipe to an endpoint. The endpoint's characteristics are also associated with the pipe at initialization. Such characteristics include maximum data payload sizes, directionality of transfers, and other appropriate characteristic data. These characteristics are used by the host in making data transfers over the pipe.

The assignment of a claim on USB bus access and bandwidth to a pipe allows the host controller to make a best effort to ensure that all input/output data requests to endpoints will be adequately serviced over the available bandwidth of the USB bus. The assignment of claims to bus access and bandwidth to a pipe limits the allocation to later configured devices. Once the bandwidth of a USB bus is completely allocated, subsequently configured devices cannot be allocated bus bandwidth. Consequently, the subsequently configured devices cannot be allocated pipes.

After the initialization process completes, the allocation of pipes to particular endpoints of a device is fixed and cannot be changed unless the device is disconnected or reset. Accordingly, devices which include a plurality of endpoint functions will be assigned a plurality of pipes (each associated with a particular endpoint).

Each endpoint is an addressable entity on the USB and is required to respond to IN and OUT tokens from the USB host controller. The IN tokens indicate that the host has requested to receive information from an endpoint; OUT tokens indicate that the host is about to send information to an endpoint.

On detection of an IN token addressed to an endpoint, the endpoint is responsible for responding with a data packet. If the endpoint is currently stalled, a STALL handshake packet is sent. If the endpoint is enabled, but no data is present, a NAK (Negative Acknowledgement) handshake packet is sent.

Similarly, on detection of an OUT token addressed to an endpoint, the endpoint is responsible for receiving a data packet sent by the host and storing it in a buffer. If the endpoint pipe is currently stalled, at the end of data transmission, a STALL handshake packet is sent. If the endpoint pipe is currently disabled, at the end of the data transmission, no handshake packet is sent. If the endpoint pipe is enabled, but no buffer is present in which to store the data, a NAK (Negative Acknowledgement) handshake packet is sent.

A disabled endpoint, or endpoints not currently mapped to an endpoint pipe do not respond to IN, OUT, or SETUP tokens.

The USB defines four types of data transfers over a pipe: control, bulk, interrupt, and isochronous.

Control transfers are used by the host to configure a device upon attachment to a hub. Control transfers may also be used by the host controller for implementation specific transactions with a device.

Bulk transfers are sequential transfers generally of large amounts of data. Bulk transfers provide reliable transactions by use of error detection and re-sending corrupted data. The bus bandwidth allocated for a bulk transfer can be whatever is currently available as bulk transfers are not time sensitive.

Interrupt transfers are small spontaneous data transactions emanating from a device.

Isochronous transfers are continuous, real-time data transactions. Isochronous transfers are allocated a dedicated portion of a USB network's bandwidth to ensure timely completion of isochronous transactions.

The USB specification defines a control transfer protocol for use in configuring, commanding, and checking status of a device. A control transfer is composed of a setup transaction which moves request information from the host to the device, optional data transactions which send data in the direction indicated by the setup transaction, and a status transaction which returns status information from the device to the host. The setup transaction specifies the amount of data to be sent during the data transaction.

The occurrence of an IN or OUT data transaction in the control transaction provides three possible transaction sequences: a control write sequence, a control read sequence, and a control no-data sequence. Each of these will now be described in greater detail.

Figure 4A:
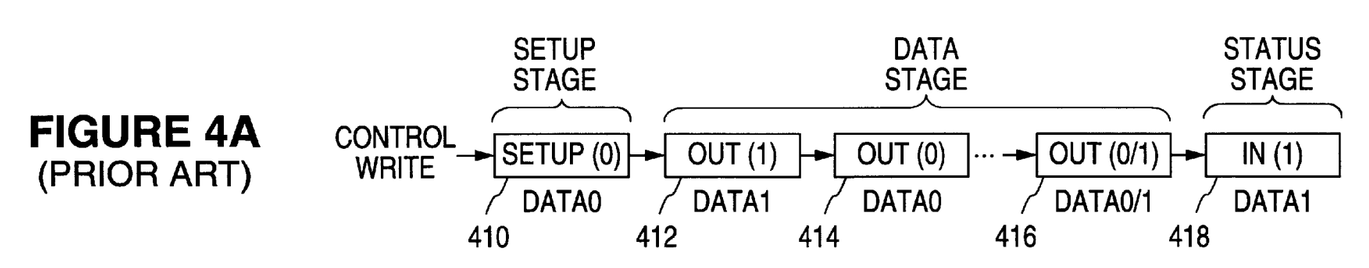
FIG. 4A is a flow chart showing data flow over a USB network during a control write transfer.

Turning to FIG. 4A, a control write sequence is shown. The control write sequence includes three stages: a setup stage, a data stage and a status stage. The setup stage consists of a SETUP transaction 410 having a DATA0 PID. The SETUP transaction 410 specifies that an OUT data stage will follow. The data stage consists of an OUT transaction 412 having a DATA1 PID. The OUT transaction 412 is followed by an OUT transaction 414 having a DATA0 PID. This transaction is followed by as many transactions as are required to transmit the necessary data from the host. This will depend both upon the size of the data in the host and the size of the transmitted packets. The DATA PID alternates between 1 and 0 for the OUT transactions used in the data stage. The final OUT transaction 416 ends the data stage. The status stage consists of a single IN transaction 418 having a DATA1 PID.

Figure 4B:
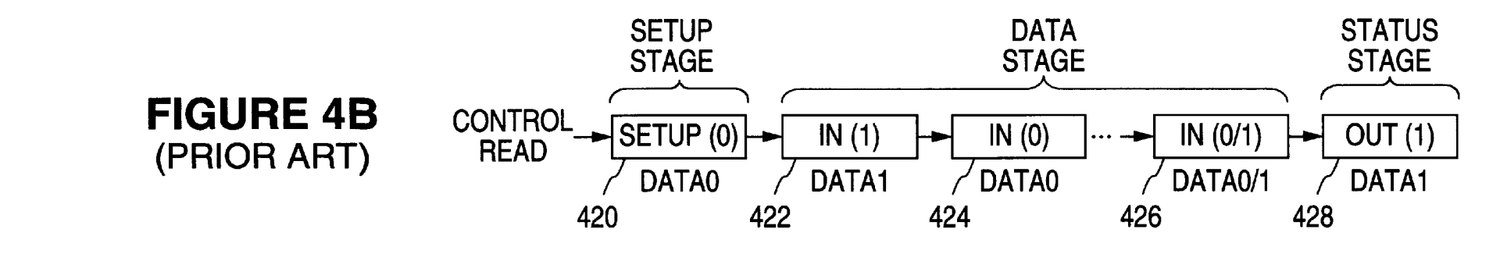
FIG. 4B is a flow chart showing data flow over a USB network during a control read transfer.

Turning to FIG. 4B, a control read sequence is shown. The control data IN sequence includes three stages: a setup stage, a data stage and a status stage. The setup stage consists of a SETUP transaction 420 having a DATA0 PID. The SETUP transaction 420 specifies that an IN data stage will follow. The data stage consists of an IN transaction 422 having a DATA1 PID. The IN transaction 422 is followed by an IN transaction 424 having a DATA0 PID. This token is followed by as many transaction as are required to transmit the necessary data from the device. This will depend both upon the size of the data in the device and the size of the transmitted packets The DATA PID alternates between 1 and 0 for the IN transactions used in the data stage. The final IN transaction 426 ends the data stage. The status stage consists of a single OUT transaction 428 having a DATA1 PID.

Figure 4C:
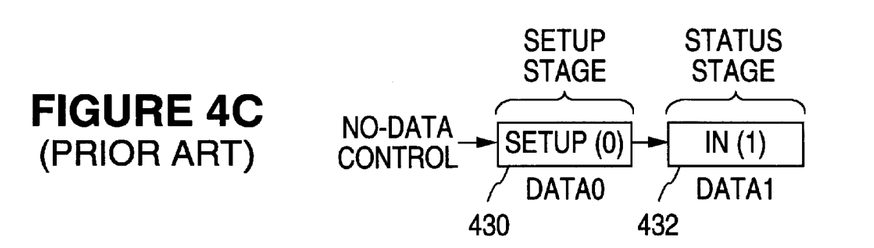
FIG. 4C is a flow chart showing data flow over a USB network during a control no-data transfer.

Turning to FIG. 4C, a control no-data sequence is shown. The control no-data sequence includes two stages: a setup stage and a status stage. The setup stage consists of a SETUP transaction 420 having a DATA0 PID. The status stage consists of a single IN transaction 428 having a DATA1 PID.

Figure 3:
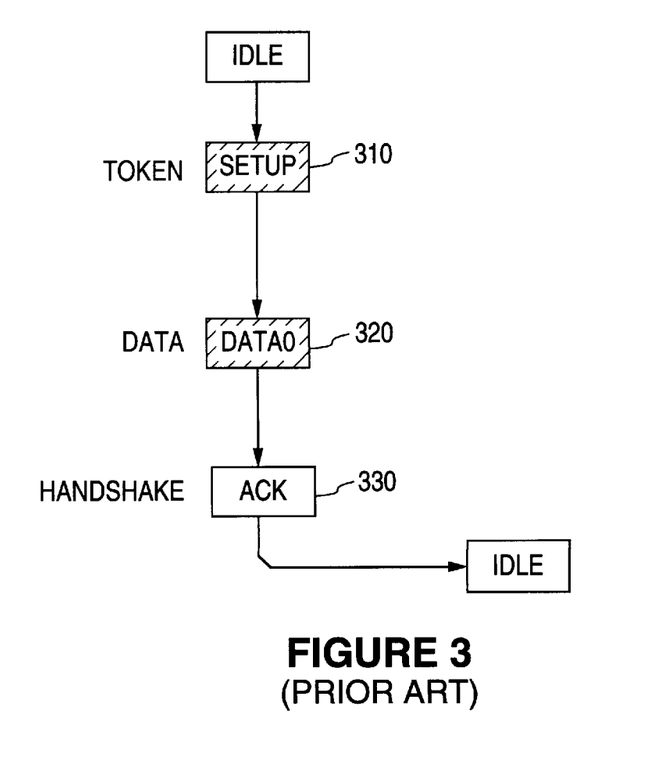
FIG. 3 is a flow chart showing data flow over a USB network during a SETUP transaction.

A flow chart illustrating a setup transaction is shown in FIG. 3. The transaction begins with SETUP token 310 sent from the host. A setup transaction always includes a DATA0 PID for the data field. The device then responds by sending an ACK handshake to complete the SETUP transaction.

Figure 5:
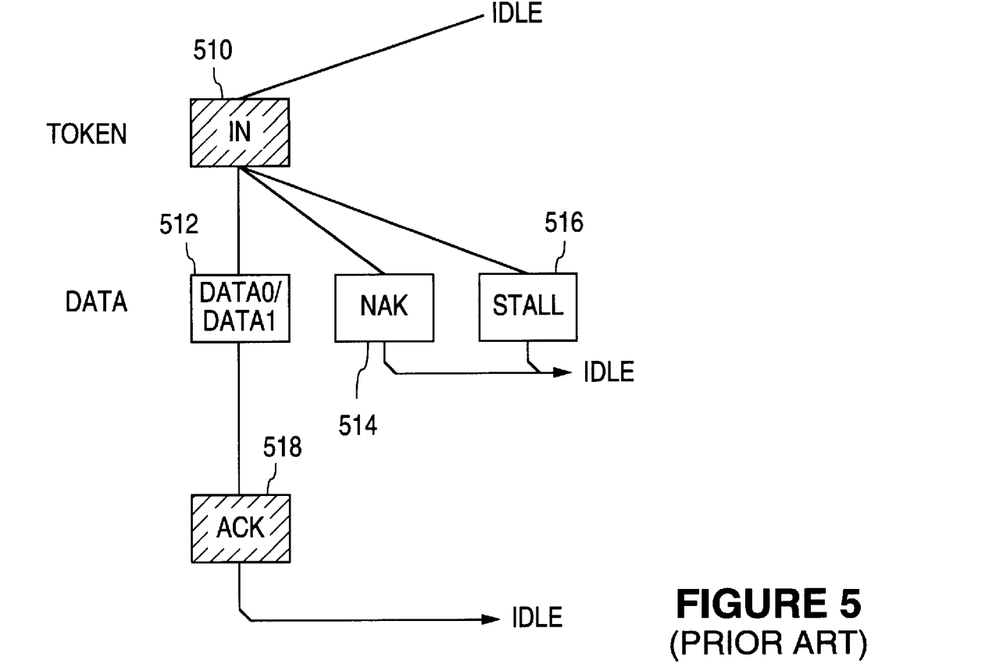
FIG. 5 is a flow chart showing data flow over a USB network during an IN transaction.

A flow chart illustrating an IN transaction is shown in FIG. 5. The IN transaction begins with an IN token 510 which is sent from the host to the device. The device should then respond with the appropriate DATA packet 512 (either a DATA0 or a DATA1 packet). If, however, the device is temporarily unable to return a DATA packet, it will instead return NAK handshake 514. If the device is unable to return a DATA packet and will require host intervention to recover, it will return a STALL handshake 516. Returning to DATA packet 512, the host will respond with an ACK handshake 518 upon receipt of this packet.

Figure 6:
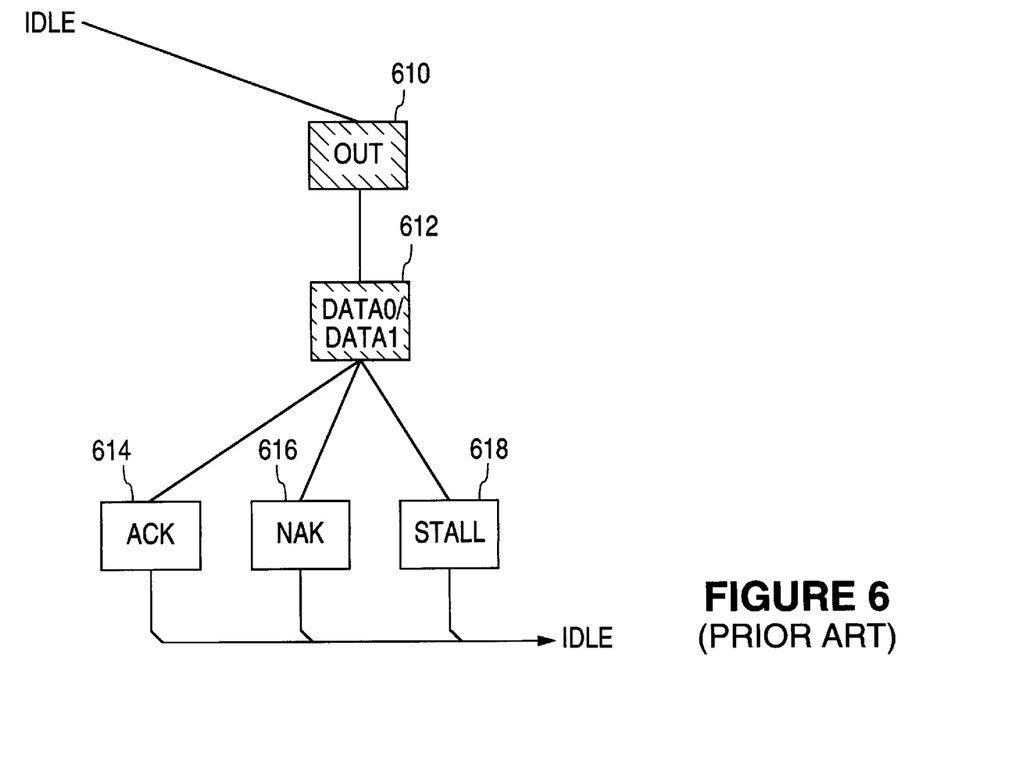
FIG. 6 is a flow chart showing data flow over a USB network during an OUT transaction.

A flow chart illustrating an OUT transaction is shown in FIG. 6. The OUT transaction begins with an OUT token 610 which is sent from the host to the device. The host then sends the appropriate DATA packet 612 (either a DATA0 or a DATA1 packet). If the device receives DATA packet 612 without errors and is ready to receive another packet, it returns ACK handshake 614. If the device receives DATA packet 612 without errors but needs the host to re-send the packet, it returns NAK handshake 616. The NAK handshake is used when a DATA packet's intended endpoint is in a state which temporarily prevents it from receiving the DATA packet. If the device receives the DATA packet 612 but is in a stall condition, it returns a STALL handshake to indicate that the host should not attempt to re-send the packet. If the data packet 612 is received with a CRC or bit stuffing error, no handshake is returned.

The Universal Serial Bus requires that should a connected device receive an unexpected SETUP token, the device must accept the SETUP token.

To accept SETUP tokens and the corresponding DATA0 packet, USB devices dedicate memory for receiving this data. In addition, USB devices allocate memory for receiving tokens for at least one other endpoint. As a USB device may support up to sixteen endpoints, often memory is dedicated to each endpoint for receiving tokens for that endpoint and for sending and receiving data.

Only one endpoint may be active at a time. Accordingly, the memory associated with an inactive endpoint will not be read to transmit data over the Universal Serial Bus. Likewise, the memory associated with an inactive endpoint will not be written to with data from the Universal Serial bus. Nonetheless, each endpoint typically maintains dedicated memory.

Accordingly, a USB device is desired which does not require dedicated memory buffers for each endpoint. Moreover, a USB device is desired which does not require a dedicated memory buffer for a control endpoint but is able to accept unexpected SETUP tokens.

SUMMARY OF THE INVENTION

It is an object of the invention to provide a memory space which may be accessed by a plurality of endpoint pipes to transmit data.

It is another object of the invention to provide a memory space which may be accessed by a plurality of endpoint pipes to receive data.

It is another object of the invention to always accept a SETUP token in a ready state.

It is a further object of the invention to reduce the amount of memory which must be dedicated to a control endpoint pipe.

It is an advantage of the invention to provide a memory space which may be shared amongst the different types of endpoint pipes.

It is another advantage of the invention to allow a processor to examine a setup packet of a control transfer in a memory and to then allow the processor to prepare the rest of the control transfer.

It is a further advantage of the invention to provide a controller, which performs the control transfer and automatically responds with appropriate handshakes.

It is a feature of the invention to provide a double memory buffer for sending and receiving data.

It is another feature of the invention to provide a memory pipeline for transferring data from a Universal Serial Bus to memory.

According to one aspect of the invention, a method for operating a control endpoint on a Universal Serial Bus provides a transceiver operationally coupled with the Universal Serial Bus for sending and receiving data; provides a controller operationally coupled with the transceiver wherein the controller provides data to the transceiver for transmission over the Universal Serial Bus and accepts data which the transceiver receives over the Universal Serial Bus; provides a memory operationally coupled with the controller wherein the controller may save data to the first memory and may copy data from the first memory; provides a function operationally coupled with the memory and with the controller wherein the function may provide commands to the controller and may save data to the memory and may copy data from the memory; receives a SETUP token from a host on the Universal Serial Bus wherein the SETUP token indicates that the host will perform a control transfer; receives a first DATA0 packet from the host on the Universal Serial Bus wherein the first DATA0 packet indicates that the control transfer will include a data stage having at least one data transaction; and allocates a portion of the memory for the at least one data transaction wherein the function performs the allocation and provides a first memory address to the controller and further wherein the first memory address points to a first memory location within the portion of the memory.

According to another aspect of the invention, a device for connecting to a Universal Serial Bus utilizes a buffer memory for storing data; a controller operationally coupled with the buffer memory and with a Universal Serial Bus wherein the controller utilizes a first and second memory address pointer wherein the first and second memory address pointer hold an address within the memory buffer, and endpoint pipe state logic for maintaining the current state of an endpoint pipe wherein the endpoint pipe state logic indicates whether the endpoint pipe contains data for transmitting over the Universal Serial Bus; and a function operationally coupled with the controller and with the buffer memory wherein the function stores data in the buffer memory and assigns the corresponding address to the first and second buffer memory pointer wherein when the controller receives an IN token of a control read transfer the controller automatically sends a NAK if the endpoint pipe state logic indicates that the endpoint pipe does not contain data and automatically sends the data if the endpoint pipe state logic indicates that the endpoint pipe does contain data.

These and other objects, features, and advantages will become apparent when considered with reference to the following description and the accompanying drawings.

DETAILED DESCRIPTION OF THE PREFERRED EMBODIMENTS

The invention described in this application is an aspect of a larger set of inventions described in the following co-pending applications which are commonly owned by the assignee of the present invention, and are hereby incorporated by reference: U.S. patent application Ser. No. 09/003,963, filed Jan. 7, 1998, entitled "Apparatus and Method for Implementing a Versatile USB Endpoint Pipe" (attorney docket no. NSC1-D2400); U.S. patent application Ser. No. 09/004,003, filed Jan. 7, 1998, entitled "Apparatus and Method of Implementing a USB Endpoint Pipe with Double Buffering Support" (attorney docket no. NSC1-D2500); U.S. patent application Ser. No. 09/004,004, filed Jan. 7, 1998, entitled "An Apparatus and Method for Transmitting and Receiving Data Into and Out of a Universal Serial Bus Device" (attorney docket no. NSC1-2600); U.S. patent application Ser. No. 09/003,897, filed Jan. 7, 1998, entitled "Apparatus and Method of Transmitting and Receiving USB Isochronous Data" (attorney docket no. NSC1-D2700); U.S. patent application Ser. No. 09/004,005, filed Jan. 7, 1998, entitled "An Apparatus and Method for Providing an Interface to a Compound Universal Serial Bus Controller" (attorney docket no. NSC1-D2900); U.S. patent application Ser. No. 09/003,925, filed Jan. 7, 1998, entitled "An Apparatus and Method for Initializing a Universal Serial Bus Device" (attorney docket no. NSC1-D3000).

Figure 2:
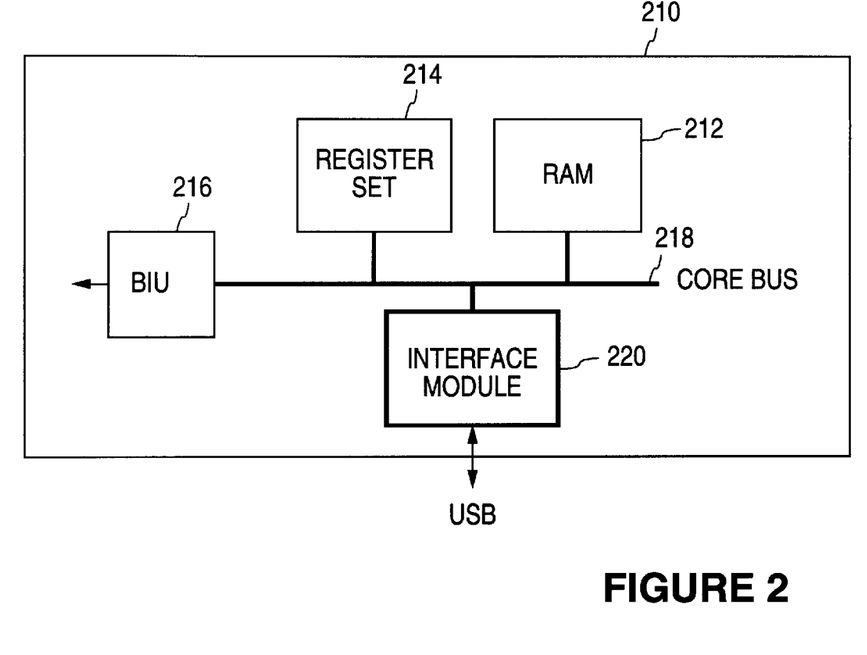
FIG. 2 is a block diagram of one preferred embodiment of an interface module for a Universal Serial Bus device in accordance with the present invention.

With reference now to FIG. 2, a USB device 210 in accordance with the invention is described. The preferred embodiment of the device meets Revision 1.0 of the USB Specification while providing a number of advantages over conventional USB devices. The USB device 210 includes a USB interface module 220, a register set 214, a RAM 212, and a Bus Interface Unit (BIU) 216.

The interface module 220 connects to a USB network to send and receive data. The interface module 200 also connects to register set 214, RAM 212, and BIU 216. The core bus 218 allows the interface module 220 to access the register set 214 and the RAM 212.

The BIU 216 provides access to the core bus 718 address space by performing read and write transfers as a master and register access as a slave. In addition, the BIU provides a data pipeline. The data pipeline may be used to temporarily hold data on its way to a memory location.

Figure 7:
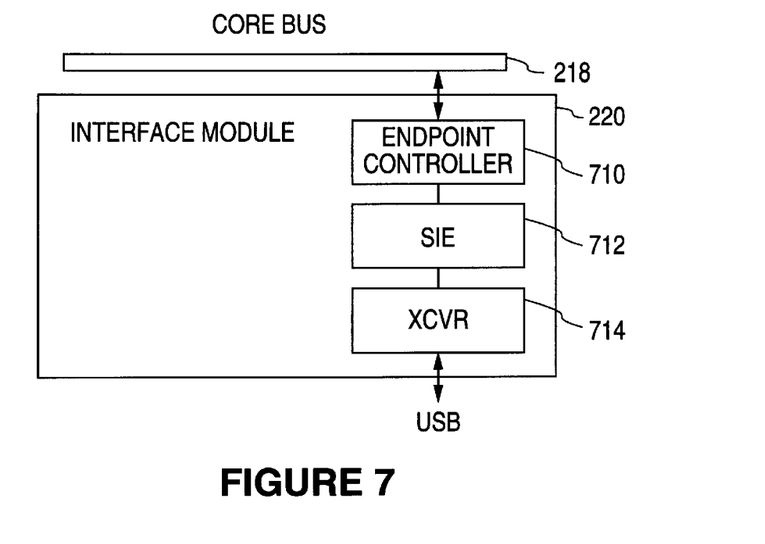
FIG. 7 is a block diagram of one preferred embodiment of an interface module for a Universal Serial Bus device in accordance with the present invention.

Turning now to FIG. 7, the USB interface module 220 of FIG. 1 is described. The USB Interface Module 220 provides the interface for the USB device 210 to connect to a USB network. The interface module 220 includes an integrated USB transceiver 714, a serial interface engine (SIE) 712, and the endpoint controller 710.

The transceiver 714 provides the physical interface with a USB network. The transceiver includes both drivers and receivers which comply with the physical layer specifications of Revision 1.0 of the USB Specification.

The serial interface engine 712 is operationally coupled with the transceiver 714 and is comprised of a physical (PHY) level and a media access control (MAC) level. The physical level includes a digital-clock recovery circuit, a digital glitch filter, an End_Of$_{13}$Packet detection circuit, and a bit-stuffing and de-stuffing logic circuit.

The media access control level includes packet formatting, cyclic redundancy check generation and checking, endpoint address detection, and provides the necessary control to give the NAK, ACK and STALL responses as determined by the end-point controller 202 for the specified endpoint pipe. The serial interface engine 712 is also responsible for detecting and reporting USB-specific events such as Reset, Suspend and Resume.

The endpoint controller 710 is operationally coupled with the serial interface engine 712 and provides the interface for USB function endpoints.

The endpoint controller 710 operates as a master and slave on the core bus 118 and supports all the USB endpoint classes: control, bulk, isochronous and interrupt. Slave access is used to access internal control registers of the register set 214, and master access is used to transfer data between endpoints and a RAM 212.

The endpoint controller 710 maintains separate state information for each endpoint pipe. State information required for immediate decisions, such as responding with a NAK or STALL handshake, is kept within the endpoint controller 710 at all times for each endpoint pipe in a Partial Endpoint Pipe Storage. This information is used to direct the media access control layer of the serial interface engine 712 to give the proper ACK, NAK, and STALL responses. Other information necessary for endpoint operation is kept in an endpoint array of the RAM 212.

Figure 8:
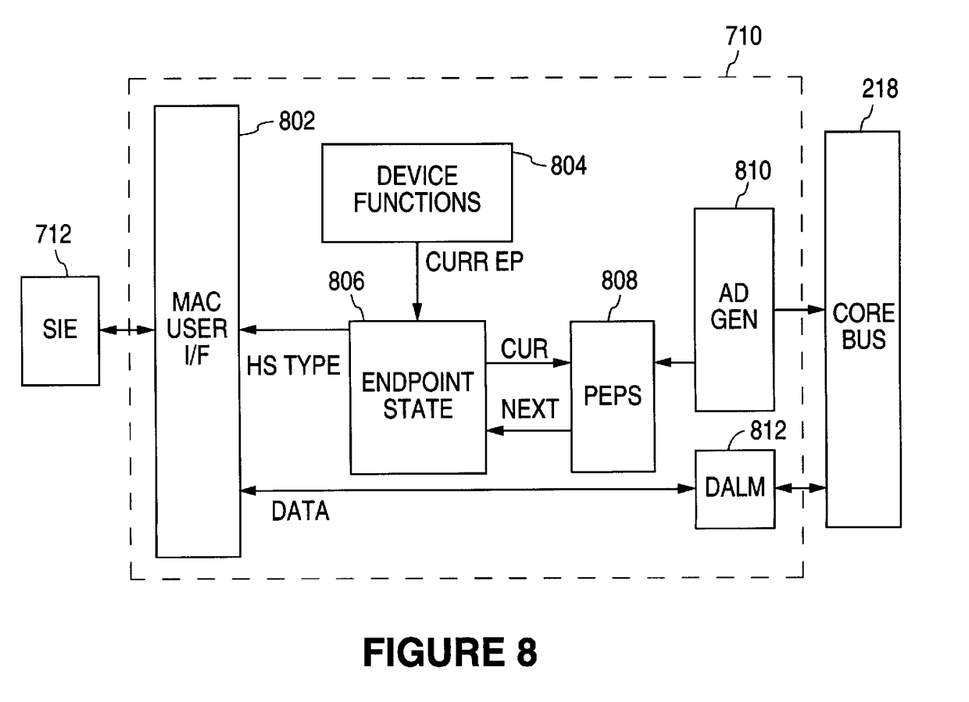
FIG. 8 is a block diagram of a preferred embodiment of the endpoint controller of FIG. 7.

Turning now to FIG. 8, the structure of the endpoint controller 710 will be described in greater detail. The endpoint controller 710 is comprised of several functional blocks. Specifically, the endpoint controller 710 includes a media access control interface 802, a device functions block 804, an endpoint state machine 806, a partial endpoint pipe storage (PEPS) 808, an address generator 810, and a data alignment multiplexor 812.

The media access control interface 802 is coupled with the endpoint state machine 806 and the data alignment multiplexor 812 to provide the interface to the media access control level of the serial interface engine 712. Some domains of the endpoint controller 202 operate using a clock on the core bus 218, other domains operate using a local clock of the endpoint controller 710. The media access control interface 802 synchronizes data bytes between the various domains with an asynchronous handshake for each byte transferred out of the endpoint controller 710.

The device function block 804 performs device functions such as address checking and generation. The device function block 804 is operationally coupled to the endpoint state machine 806 to provide such information in relation to the currently accessed endpoint pipe.

The endpoint state machine 806 performs the functions relating to maintaining the state of an active endpoint pipe. The state machine 806 maintains the state of an active endpoint pipe with well-defined transitions to synchronize hardware and software interactions. The current state is visible to a host controller via an endpoint state register. In the preferred embodiment, only one endpoint pipe is active at any given time. The endpoint pipe state machine 806 is, therefore, shared among all endpoint pipes.

The partial endpoint pipe storage 808 stores state information required for immediate decisions, such as responding with a NAK or STALL handshake, at all times for each endpoint pipe.

The address generator 810 provides the addresses necessary for use in reading and writing to the RAM over the core bus.

The data alignment multiplexor 812 provides the necessary data byte alignments before transfers on the core bus.

Figure 9:
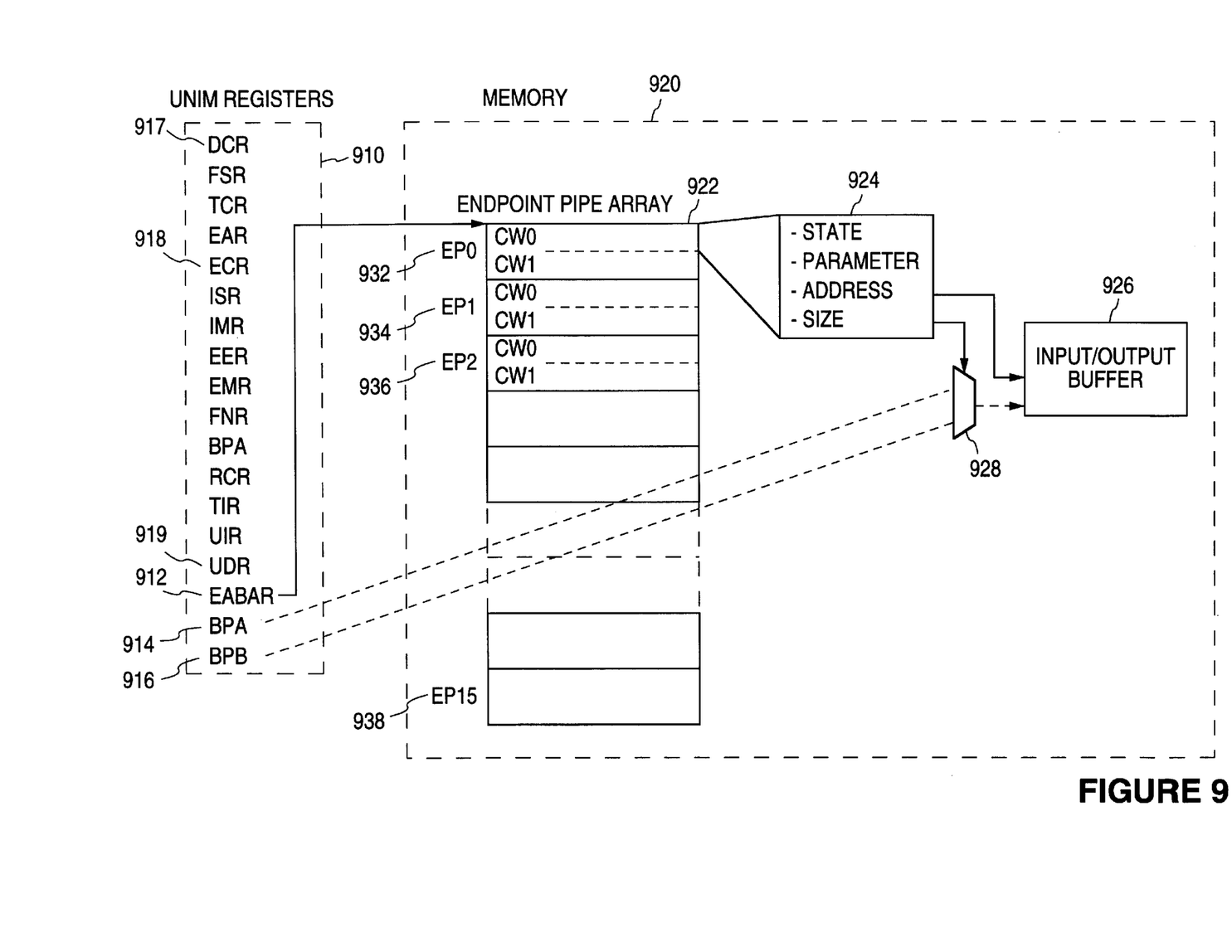
FIG. 9 is a block diagram showing one embodiment of a programming model for a Universal Serial Bus device in accordance with the present invention.

A preferred embodiment of the above mentioned endpoint pipe array will now be described in greater detail. Turning to FIG. 9, a preferred programming model is shown. This programming model shows a plurality of registers 910 that are used to control and monitor the operation of a USB device. The model also includes an endpoint pipe array 922 located in memory 920. The endpoint pipe array 922 is used to control endpoint parameters specific to a particular endpoint transfer.

The programming model of FIG. 6 includes a register set 910 and a memory 920. Portions of the register set 910 and portions of the memory 920 coordinate to monitor and control a particular endpoint transfer. FIG. 9 also shows a preferred embodiment of the relationship between the register set 910 and the memory 920 in accordance with the invention.

The endpoint pipe array 922 includes a first control word CW0 and a second control word CW1 for each of sixteen endpoint pipes. The endpoint pipe array 922 is located in memory at an address stored in an endpoint array base address register (EABAR) 912. This endpoint pipe array is indexed by a four-bit endpoint pipe number, and by a one-bit endpoint pipe control word pointer. As shown, an endpoint pipe number of zero, EP0 932, points to the first pair of control words in the endpoint pipe array 922. Likewise, EP1 points to the second pair of control words; EP2 points to the third pair and so on. EP15 points to the last pair of control words in the preferred embodiment.

The control words contains all the information required to operate an active endpoint pipe. As shown by block 924, each control word contains state, parameter, address, and size information for an endpoint pipe. There are two such entries for each endpoint pipe. The control word to be accessed next is determined by the endpoint pipe control word pointer CWP value. Immediately after a IN, OUT or SETUP token is received to an endpoint pipe currently in a ready state, the control word of the selected endpoint pipe at the current control word pointer is read to determine how to respond to the token. At the end of a transfer, when completion status is written, the control word is updated with the current status, the CWP is incremented, and the other control word is read. When intermediate status is written, only the most significant byte of the control word is updated. The control word format is shown below:

| Bits  | Function Label                 |
|-------|--------------------------------|
| 31–28 | Buffer State BS                |
| 27    | (Reserved)                     |
| 26–16 | Buffer Address BA              |
| 15    | Buffer Page BP                 |
| 14    | Buffer Rounding BR             |
| 13    | Toggle Enable TE               |
| 12    | Type Isochronous TI            |
| 11    | Interrupt on Packet Complete IC|
| 10    | Interrupt on Packet Error IE   |
| 9–0   | Byte Count BC                  |

The 4-bit buffer state BS is updated by software and the endpoint pipe controller (EPC) to synchronize the control of this buffer between them. EPC writes status indicating the use of the buffer. This field is set by node firmware to Output Ready, Input Ready, Setup Ready, Skip, Stall and Disable. All other values are set by the EPC. The EPC can also write the Stall and disable values in error conditions. The buffer can be reclaimed by node firmware when the buffer state is any of the Complete values; this includes the Input/Output Complete Status and the Error codes.

The buffer state BS can take the following values:

0: Skip. This value is used together with the Output Ready Command. Skip causes the next data packet received to be ignored and the control word pointer to be incremented. For control endpoints, this also causes the endpoint pipe state to switch from the input/ready state to the output/input Idle state. The setting of TE and TI determines which handshake is returned, and the next state of the endpoint pipe. A NAK is returned if neither TE or TI is set. If TI is set, and not TE, no handshake is returned. If TE is set, an ACK is returned and complete status is written when a packet with the proper PID is received.

1: Input Ready IRDY. This value indicates that the buffer has been written with data to transmit in response to an IN token.

2: Output Ready ORDY. This value indicates that the buffer has been allocated for writing.

3: Setup Ready SRDY. This value indicates that the buffer has been allocated for writing. This is used only on a Control Endpoint during the first transfer of control read and control write operations. Write only in control word 0.

4: Output Wait OWT. This value indicates that an error occurred while receiving OUT data from the host. This includes detection of a bit stuff error. A retry is expected as this is considered intermediate status, except in the case of an isochronous OUT endpoint where it is treated as completion status.

5: CRC Error CRCE. This value indicates that a bad CRC was detected at the end of an OUT transaction. A retry is expected as this is considered intermediate status, except in the case of an isochronous OUT endpoint where it is treated as completion status.

6: Buffer Error BUFE. This value indicates that during an OUT, data was received faster from USB than it could be written to memory. During an IN, data was not read from memory fast enough to keep up with the USB data rate. A retry is expected on this endpoint.

7: Input Wait IWT. This value indicates that the buffer is being held by the endpoint controller and is waiting to try, or retry, to transmit this buffer at the next opportunity. This occurs in the case of a missed acknowledge.

8: Input Complete ICMP. This value indicates successful completion of this input operation. The buffer may be released.

9: Output Complete OCMP. This value indicates that the buffer is full of data and no error was detected.

10: Token Error TKNE. This value indicates that a token of the wrong type for the current context of this control endpoint pipe was received. If this was an output buffer, then the endpoint is halted. If this was an input buffer, a NAK is sent and the state of the other control word is examined. This is considered a completion status.

11: Isochronous Synchronization Error SYNE. This value indicates that data was received into a buffer with TE=1 and TI=1 but CWP was not equal to the LSB of the FNR. This is considered a completion status 12: Data Error DATE. For OUT data, when CW.BR is not set and the amount of data received from the host was less than expected, or the allocated buffer was not big enough to store the OUT data. For IN data, this is set if a buffering error occurred and CW.TE was not set or CW.TI was set. This is considered a completion status.

13: (Reserved).

14: Halt. Causes the current endpoint pipe to enter its HALT state, or indicates that the endpoint has entered the HALT state.

15: Disable. Causes the current endpoint pipe to enter its DISABLE state or indicates that the endpoint has entered the DISABLE state.

The Buffer Address BA holds the eleven lower bits of the buffer address. Buffers must start on an aligned double-word boundary and can end on any byte boundary. At the end of a complete transfer, the residual value of the buffer address is written. At the end of incomplete transfers such as when the status is written to input or output wait, this field is not over-written. For OUT buffers, the first byte stored is the byte following the PID. Similarly for IN buffers, the address points to the first byte of data to be transmitted, i.e., the byte immediately following the PID in the packet. The CRC is automatically calculated and appended to the Packet, except when the IN token is received from the IS_RDY state and the control word did not have the IS field set to 1.

The buffer page bit, BP, selects between a buffer page A register, BPA 912, and a buffer page B register, BPB 916. The BP selects BPA in a zero state, and selects BPB in a one state for use as the upper memory address of the current input/output buffer.

The buffer rounding bit BR is used for out transactions. It indicates whether a received data packet may be smaller than the data buffer. When BR is zero, the data packet should exactly fill the defined data buffer. A buffer overrun or underrun status is given if the packet does not exactly fit in the buffer.

When read together with an output complete or data error buffer status, BR indicates the value of the received PID. Specifically, it is zero for DATA0 and 1 for DATA1.

Toggle Enable bit, TE, is used to compare the data packet identifier, PID, which has a value of either DATA0 or DATA1 with the Control Word Pointer for an OUT token, and is used to generate the data packet identifier for an IN token.

When TE is in a zero state, the data toggle PID is not checked on OUT transactions; the data toggle PID is generated based on the current value of the CWP in response to IN Tokens. The CWP is incremented (inverted) after each transaction, even if an ACK was not received. For Isochronous endpoints, OUT data is not written to memory until CWP is equal to the least significant bit of the Frame Number, FNR. This has no affect on data sent in response to IN tokens. Data Toggle should not be enabled for buffers allocated to receive data sent with the SETUP token.

When the TE is in a one state, the data toggle PID is checked on OUT transactions; the data toggle PID is generated based on the current value of CWP in response to IN Tokens. For OUT transactions, TE causes an ACK to be sent in response to out packets whose PID value (DATA0 or DATA1) does not match CWP. For IN transactions, CWP is incremented (inverted) after each transaction, only if an ACK handshake is returned in the response time-out period. For Isochronous endpoints, OUT data is always written to memory but if the least significant bit of FNR is not equal to CWP, the ISO sync error buffer state is written back.

Type Isochronous bit TI indicates whether the endpoint pipe is isochronous. When TI is in a one state the data is isochronous. When TI is in a zero state, the endpoint pipe may be a control, bulk, or interrupt endpoint pipe.

Interrupt on packet complete bit, IC, is set whenever the buffer status is written to input or output complete, on a packet error, or when the endpoint pipe is stalled.

Interrupt on packet error bit, IE, is set whenever the buffer state is written to one of the buffer error codes, or when the endpoint is stalled. When both IC and IE are set, CRC and bit stuff errors cause the associated buffers not to be reused in normal operation. This allows subsequent diagnostic evaluation of the associated buffer.

Byte Count bits, BC, indicate the size of the data buffer to be used. A buffer must start on an even double-word boundary, but can end on any byte boundary. For IN transactions, the BC indicates the size of the data to be transmitted. For OUT transactions, the BC indicates the size of the buffer in which data can be received. The BC may hold a zero to indicate a zero-length data packet. At the end of all complete transfers, the residual value of the byte counter is written. At the end of incomplete transfers, such as when the status is written to in-put or output wait, this field is not overwritten.

In a preferred embodiment, the endpoint command register, ECR 918, is a word-wide, read/write register. The ECR 918 is used to perform commands on a specified endpoint. Upon reset, this register is cleared. The ECR 918 register format is shown below:

| Bits | Function Label |
|---|---|
| 15–8 | (Reserved) |
| 7–4 | Endpoint Pipe Number (EPN) |
| 3–0 | Endpoint Command (CMD) |

The endpoint pipe number EPN determines the endpoint pipe on which the command is performed. In a preferred embodiment, this register can be implemented in the high-speed bus interface logic. The data is passed across the asynchronous interface. Two signals are passed back from the endpoint controller; one to indicate that the command was processed and that the command value should be cleared to "0", and another indicating that the command could not be processed and should be set to "F".

The endpoint command CMD can take the following values:

0000: Complete. This value indicates that the previous command is complete and the endpoint controller is ready to accept another command.

0001: Input Enable (CMD.IENB). This value causes the specified endpoint pipe to enter the Input Idle state I_IDL from the Stall (Halt) or Disable state. The Control Word Pointer for the specified endpoint pipe is reset to 0. If the current state is not Disable or Stall, a "F" is returned to indicate that an illegal command was attempted on this endpoint and the command is ignored.

0010: Input Ready (CMD.IRDY). This value causes the specified endpoint pipe to enter the Input Ready state I_RDY if it is currently in the Input Idle state I_IDL. This command is issued after a control word with an Input Ready buffer state I_RDY is written into the endpoint array for the corresponding endpoint. This command does not cause the control word in memory to be read; instead, it permits it to be read in response to reception of an IN token. If the current state of the endpoint is not Input Idle I_IDL, the command is ignored. If the current state is one of the Output or Setup states or Disable or Stall, a "F" is returned to indicate that an illegal command was attempted on this endpoint.

0011: Input Isochronous Ready (CMD.ISRDY). This value causes the specified endpoint pipe to enter the Input Isochronous Ready state IS_RDY, if it is currently in the Input Idle state I_IDL. This command is issued after a control word with the Input Ready buffer state is written into the endpoint array for the corresponding endpoint. This command does not cause the control word in memory to be read; instead, it permits it to be read in response to reception of an IN token. It is expected that the type field of the control word (TI) is set to isochronous, but this is not checked. If the current state of the endpoint is not Input Idle I_IDL, the command is ignored. If the current state is one of the Output or Setup states or is Disable or Stall, a "F" is returned to indicate that an illegal command was attempted on this endpoint.

0100: Output Enable (CMD.OENB). This value causes the specified endpoint pipe to enter the Output Idle state O_IDL from the Stall or Disable state. The Control Word Pointer for the specified endpoint is reset to 0. If the current state is not Disable or Stall, a "F" is returned to indicate that an illegal command was attempted on this endpoint, and the command is ignored.

0101: Output Ready (CMD.ORDY). This value causes the specified endpoint pipe to enter the Output Ready state O_RDY if it is currently in the Output Idle state O_IDL. This command is issued after a control word with an Output Ready state is written into the Endpoint Array for the corresponding endpoint. This command does not cause the control word in memory to be read; instead, it permits it to be read in response to reception of an OUT token. If the current state of the endpoint is not Output Idle the command is ignored. If the current state is one of the Input states, Stall, or Disable, then a "F" is returned to indicate that an illegal command was attempted on this endpoint.

0110: Output Isochronous Enable (CMD.OSENB). This value causes the specified endpoint pipe to enter the Output Isochronous Idle state OS_IDL from the Stall or Disable state. The Control Word Pointer for the specified endpoint is reset to 0. If the current state is not Disable or Stall, a "F" is returned to indicate that an illegal command was attempted on this endpoint, and the command is ignored.

0111: Output Isochronous Ready (CMD.OSRDY). This value causes the specified endpoint pipe to enter the Output Isochronous Ready state OS_RDY, if it is currently in the Output Isochronous Idle state OS_IDL. This command is issued after a control word with an Output Ready state is written into the Endpoint Array for the corresponding endpoint. This command does not cause the control word in memory to be read; instead, it permits it to be read in response to reception of an OUT token. If the current state of the endpoint is not Output Isochronous Idle the command is ignored. If the current state is one of the Input states, Stall, or Disable, then a "F" is returned to indicate that an illegal command was attempted on this endpoint.

1000: Setup Ready (CMD.SRDY). This value causes the specified endpoint pipe to enter the Setup Ready state S_RDY. This command is issued after a control word with an Output Ready state is written into the Endpoint Array for the corresponding endpoint. This command does not cause the control word in memory to be read; instead, it permits it to be read in response to reception of a SETUP token. If the current state of the endpoint is not Stall or Disable, the command is ignored.

1001: Disable (CMD.DISAB). This value causes the specified endpoint pipe to enter the disabled state DISABLE. This occurs immediately from any state. If the endpoint pipe is currently active, status is written in the control indicating that the endpoint was disabled.

1010: Stall (CMD.HALT). This value causes the specified endpoint to enter the Stall state HALT from any state. This occurs immediately from any state. If the endpoint pipe is currently active, status is written in the control indicating that the endpoint was stalled.

1011—1101: Reserved. These values cause no action to be performed, and return 0.

1110: Toggle CWP. This value causes the Control Word Pointer to be toggled. This is used with control transfers with an odd number of packets sent or received during the data phase.

1111: Error. This value indicates that an illegal command was attempted on the current endpoint pipe for its current state, and that a new command may be accepted.

The part of the UDR relevant to the invention of the present application is the 8-bit endpoint pipe state. This state is stored for each endpoint pipe that is returned for the currently indexed endpoint pipe. If an invalid endpoint pipe is indexed, 0 is returned. The ECR register format is shown below:

| Bits | Function Label |
| --- | --- |
| 7 | Control (CTL) |
| 6 | Control Word Pointer (CWP) |
| 5–4 | Reserved |
| 3–0 | Endpoint Pipe State (EPS) |

Control CTL: This is asserted if this endpoint pipe is capable of accepting control sequences involving the SETUP token. This bit is set after CMD.SRDY for this endpoint pipe is performed and remains set until the endpoint is Disabled.

Control Word Pointer CWP: When the control word bit is 0, control word 0 of this endpoint in the endpoint array is accessed next. When the control word bit is 1, control word 1 for this endpoint is accessed next. This is set to 0 whenever the endpoint is enabled.

The endpoint pipe state EPS can take the following values:

| Value | State |
| --- | --- |
| 0 | Disabled DIS |
| 1 | Input Idle I_IDL |
| 2 | Input Ready I_RDY |
| 3 | Input Active I_ACT |
| 4 | Stalled HALT |
| 5 | Input Missed ACK I_MAK |
| 6 | Input Isochronous Ready IS_RDY |
| 7 | Input Isochronous Active IS_ACT |
| 6 | Setup Ready S_RDY |
| 9 | Output Idle O_IDL |
| 10 | Output Ready O_RDY |
| 11 | Output Active O_ACT |
| 12 | Setup Active S_ACT |
| 13 | Output Isochronous Idle OS_IDL |
| 14 | Output Isochronous Ready OS_RDY |
| 15 | Output Isochronous Active OS_ACT |

In a preferred embodiment, only one endpoint pipe is active at any given time.

In a preferred embodiment, an each endpoint pipe maintains a state with well-defined conditions for transferring between the state that involve an implicit hardware/software synchronization. Endpoint pipe state transitions occur:

on explicit software commands to an endpoint through the endpoint command register ECR;

by reading the buffer status of the other buffer in the other control word for this endpoint at the end of a transfer; and as a result of events on USB such as receipt of IN, OUT and SETUP tokens and ACK handshakes.

Figure 10:
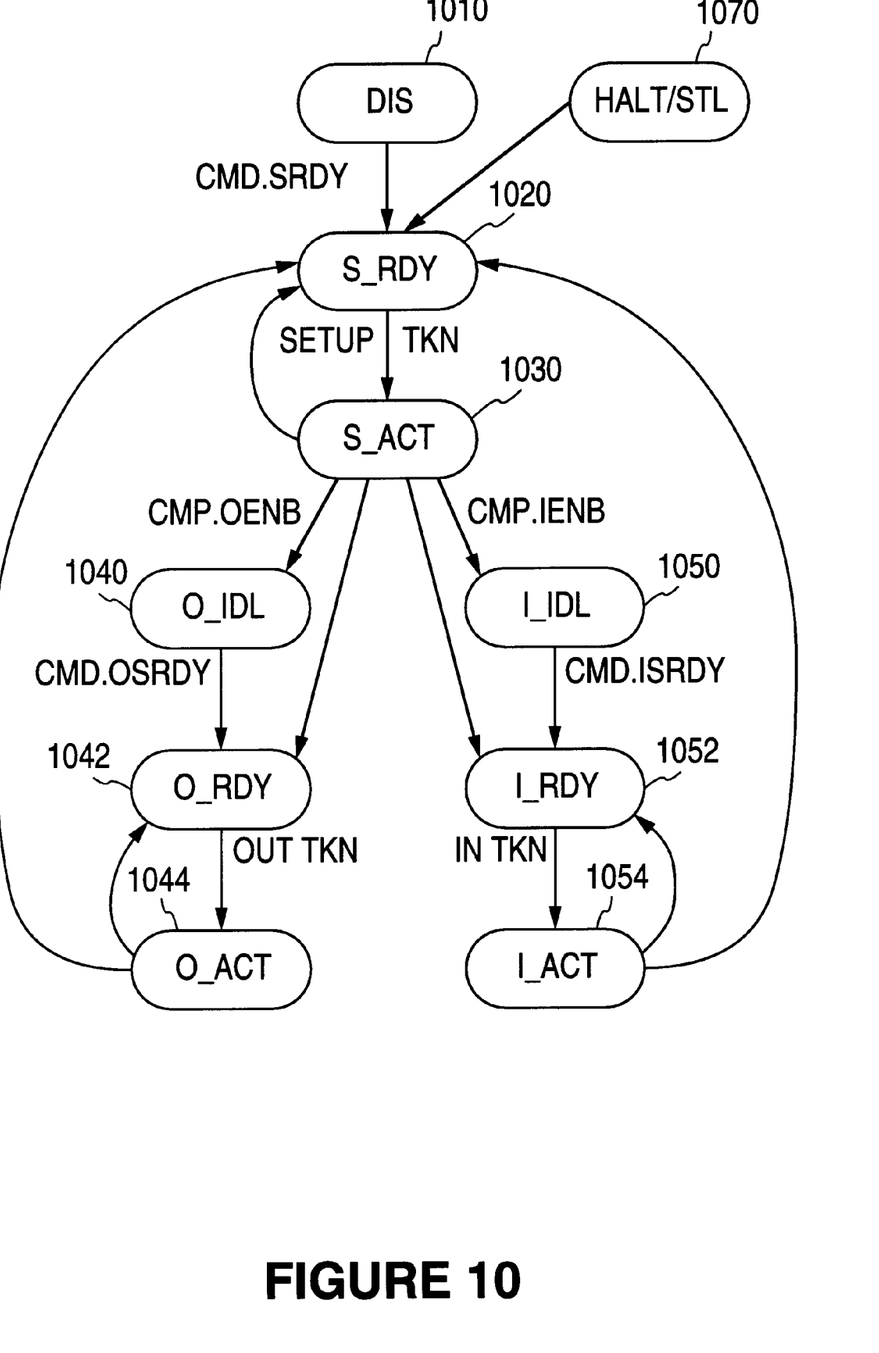
FIG. 10 is a flow chart showing states and state transitions of an endpoint during a control transaction in accordance with one embodiment of the present invention.

FIG. 10 shows the simplified endpoint pipe state machine for handling of SETUP transactions.

The current endpoint pipe state is visible in the endpoint state register, which is accessible through the USB Index and Data registers. In a preferred embodiment, at most one endpoint pipe is ever in any of the active states at any given time. This allows sharing of the active state logic among all of the endpoint pipes.

An endpoint pipe can have the following states during a SETUP transaction, as shown in FIG. 10:

Disable: The DIS state 1010 is entered upon reset, upon the disable command to this endpoint pipe, and upon detection of a disable state in the buffer state of a control word. Any token received to this endpoint pipe while in this state is returned with no handshake. Software intervention is required to remove the endpoint pipe from this state, typically through an enable command to one of the Idle states.

Halt/Stall: The HALT/STL state 1070 is entered upon the stall command to this endpoint pipe, upon detection of a stall state in the buffer state of a control word, and upon certain error conditions. Any token received to this endpoint pipe while in this state is returned a STALL handshake to indicate that the endpoint is currently stalled. Software intervention is required to remove the endpoint pipe from this state, typically through an enable command to one of the Idle states.

Setup Ready: The S_RDY state 1020 is entered after this endpoint pipe has been given a buffer in which to write data. This state is entered by a setup ready command after the appropriate word in the endpoint array is written, or upon detection of the setup ready buffer state.

Setup Active: The S_ACT state 1030 is entered upon receipt of a SETUP token from the Setup Ready state. While in this state, data from the USB is written to memory. At the end of an output transfer, status is written to the control word at CWP, the CWP is inverted, and the other control word for this endpoint pipe is read. The appropriate transition is made based on the buffer state to the output idle, output ready, input idle, or input ready state depending on the type of control transfer and the buffer state read.

Input Idle. In the I_IDL state 1050, the endpoint expects that a buffer will soon be allocated. A NAK handshake is returned in response to an IN token mapped to this endpoint pipe. No response is returned for OUT tokens from this endpoint pipe.

Input Ready. This I_RDY state 1052 is entered via an Input Ready command to this endpoint pipe or upon detection of another Input buffer at the end of a transfer. The command should only be given after a buffer has been allocated to this endpoint by writing the control word at the appropriate location in the endpoint array. This control word should point to a data buffer with data to return to the host in response to the next IN token received to this endpoint pipe. The PID value is transmitted as DATA0 when CWP is 0 and DATA1 when CWP is 1.

Input Active: I_ACT state 1054 is entered upon receipt of an IN token when the selected endpoint state is currently Input Ready. While in this state, data is transferred from memory to the USB. Upon completion of the data transfer, an ACK handshake should be received within 16 bit times. At the end of this time-out period, if an ACK was not received, the buffer wait status is written back to the control word. However, the address and byte counter are not overwritten because a retransmission will occur and the current values need to be used again. If an ACK is received, the buffer status along with the current value of the address and byte counter are written. Then the other control word on this endpoint is read to determine the next state of the endpoint to be used the next time a token is directed to this endpoint pipe. If this endpoint is being used for a control transfer a transfer to the output Ready or Output Idle state can occur to complete the status phase of a control read transfer.

Output Idle: In the O_IDL state 1040, the endpoint expects that a buffer will soon be allocated. A NAK handshake is returned in response to an OUT token mapped to this endpoint pipe. No response is returned for IN tokens on this endpoint pipe.

Output Ready: The O_RDY state is entered after this endpoint pipe has been given a buffer in which to write data. This can be entered via an Output Ready command from the O_IDL state 1040 after the appropriate word in the endpoint array is written, or upon detection of another Output buffer at the end of a transfer.

Output Active: The O_ACT state 1044 is entered upon receipt of an OUT token. While in this state data from the USB is written to memory. At the end of an output transfer, status is written to the control word at CWP. If the transfer was not successful, i.e., a CRC or bit stuffing error was detected, this is written as the buffer status. If the transfer was successful, the output complete buffer status is written, CWP is inverted, and the other control word for this endpoint pipe is read. The appropriate transition is made based on the buffer state. If this endpoint is being used for a control transfer, a transfer to the Input Ready or Input Idle state can occur to complete the status phase of a control write transfer.

After reset, all of the endpoints are disabled. An endpoint is enabled by giving an enable command to an endpoint. This should only be done when input and/or output buffers will soon be allocated to this endpoint. All endpoints not currently mapped to an endpoint pipe are considered disabled.

Software allocates buffers to endpoints pipes on an as needed basis. After each buffer is allocated, it performs the input or output ready command on the endpoint pipe. If the endpoint pipe is currently in the Idle state, it enters the appropriate ready state. If the endpoint pipe is currently in a ready or active state, it ignores all commands except disable and stall commands to the endpoint pipe, which it handles immediately. Software must do this write in order to avoid potential synchronization problems since the UNIM endpoint pipe handling is asynchronous to the software operations.

Since up to two buffers can be allocated to each endpoint, the next buffer can be prepared while the current one is being processed to speed the data transfer and avoid unnecessary NAK handshakes.

In view of the forgoing descriptions, the operation of the device as a control endpoint will now be described in greater detail from the view of controlling functional software. Endpoint 0 is typically a control endpoint. In addition, a mapping mechanism allows other endpoints to become control endpoints. For a control endpoint, control word 1 and control word 0 should always be written together. For example, the SRDY command for the next control transfer should be written together with the buffer or packet for the status transfer of the current control transfer. When an odd number of data packets are sent during the data phase of a control read or write operation, before the status phase is sent, software must adjust the control word pointer because the status phase must be put in control word 1 and the next SRDY buffer must be put in control word 0. To accomplish this, software may insert a SKIP buffer, or issue a toggle CWP command. Software may then issue the ready command for the status phase buffer.

Should a SETUP token be detected on a Control Endpoint for which an SRDY buffer is not currently available, a best effort is made to receive the SETUP token. While waiting for software to allocate a buffer, the SETUP token is stored in the data pipeline of a memory pipe.

If a valid SETUP is received, an interrupt is asserted via an interrupt bit. In response to the interrupt, software should write a buffer on control word 0 and issue an SRDY command. This causes the pending SETUP to be written to memory. The SRDY command causes the endpoint to be considered a control endpoint, and remains set until an input enable or output enable command is performed The SRDY buffer should be provided as quickly as possible because when the interrupt is asserted, it blocks the data path from any additional data transfers. While waiting for the buffer, all tokens received over the USB network are returned a NAK.

After a Setup is received, it must be reviewed to determine the appropriate response. At this point firmware puts on additional input or outputs buffers as appropriate. If the Setup is a command not supported by the function, a new SRDY buffer is put on control word 0 and the SRDY command is given. This causes all tokens on this endpoint to be returned a NAK handshake, until the next setup is received. In the interim period while software is analyzing the setup, NAKs are sent in response to the tokens.

Although the embodiments described herein are with reference to specific device structures, programming states, and programming models, the present invention can be applied to a variety of other devices implementing different programming states and models without departing from the scope of the invention. Those having ordinary skill in the art will certainly understand from the embodiments disclosed herein that many modifications are possible without departing from the teachings hereof. All such modifications are intended to be encompassed within the following claims.

What is claimed is:

1. A method of operating a control endpoint on a Universal Serial Bus comprising the steps of:
providing a transceiver operationally coupled with the Universal Serial Bus to send and receive data;
providing a controller operationally coupled with the transceiver, wherein the controller provides data to the transceiver for transmission over the Universal Serial Bus and accepts data which the transceiver receives over the Universal Serial Bus;
providing a memory operationally coupled with the controller, wherein the controller saves data to the memory and copies data from the memory;
providing a function element operationally coupled with the memory and with the controller, wherein the function provides commands to the controller saves data to the memory and copies data from the memory;
receiving a SETUP token from a host coupled with the Universal Serial Bus, wherein the SETUP token indicates that the host will perform a control transfer;
receiving a first DATA0 packet from the host on the Universal Serial Bus wherein the first DATA0 packet indicates that the control transfer will include a data stage having at least one data transaction; and
allocating a portion of the memory for the at least one data transaction wherein the function element performs the allocation and provides a first memory address to the controller, and further wherein the first memory address points to a first memory location within the portion of the memory.

2. The method of claim 1 wherein the first DATA0 packet indicates that the data transactions are IN transactions.

3. The method of claim 2 wherein the step of allocating a portion of memory further comprises allocating a portion of memory sufficient to hold data for all the transactions in the data stage.

4. The method of claim 3 wherein the first memory location holds data for a first data transaction.

5. The method of claim 4 wherein the step of allocating a portion of the memory further comprises providing a second memory address to the controller wherein the second memory address points to a second memory location within the portion of the memory.

6. The method of claim 5 wherein the controller reads data from the first memory location and provides the data to the transmitter to send over the Universal Serial Bus.

7. The method of claim 6 wherein the step of allocating a portion of the memory further comprises providing a third memory address to the controller wherein the third memory address points to a third memory location within the portion of the memory and further wherein the third memory address is provided to the controller only after the controller has copied data from the first memory location.

8. The method of claim 7 wherein the third memory address holds data for a third data packet.

9. The method of claim 1 further comprising the step of receiving an unexpected SETUP token and storing the unexpected SETUP token in a data pipeline.

10. The method of claim 9 further comprising the step of the controller notifying the function of the unexpected SETUP token.

11. The method of claim 10 further comprising the step of the function providing a memory address to the controller wherein the memory address points to a buffer in the memory.

12. A device for connecting to a Universal Serial Bus comprising:
a buffer memory for storing data;
a controller operationally coupled with the buffer memory and with a Universal Serial Bus wherein the controller comprises:
a first and second memory address pointer wherein the first and second memory address pointer hold an address within the memory buffer;
endpoint pipe state logic for maintaining the current state of an endpoint pipe wherein the endpoint pipe state logic indicates whether the endpoint pipe contains data for transmitting over the Universal Serial Bus;
a function operationally coupled with the controller and with the buffer memory wherein the function stores data in the buffer memory and assigns the corresponding address to the first and second buffer memory pointer wherein when the controller receives an IN token of a control read transfer the controller automatically sends a NAK if the endpoint pipe state logic indicates that the endpoint pipe does not contain data and automatically sends the data if the endpoint pipe state logic indicates that the endpoint pipe does contain data.

13. The device of claim 12 wherein the controller further comprises a data pipeline for temporarily storing data received from the Universal Serial Bus and wherein the endpoint pipe state logic further indicates whether the endpoint pipe is in a ready state for receiving a SETUP transaction and wherein when a SETUP token is received over the Universal Serial Bus and the endpoint pipe state logic indicates that the endpoint pipe is not in a ready state the SETUP token is stored in the data pipeline.

14. The device of claim 13 wherein the controller further comprises an interrupt bit for indicating that the pipe storage is currently storing a SETUP token.

15. The device of claim 14 wherein when the interrupt bit indicates that the storage pipe is currently storing a SETUP token the function allocates a buffer in memory and assigns said first memory pointer to an address in the buffer.

16. The device of claim 15 wherein the function assigns the first memory pointer to point to a buffer for storing the SETUP token.

17. The device of claim 13 wherein the controller automatically sends a NAK while holding the SETUP token in the data pipeline.

18. The device of claim 17 wherein the controller automatically transfers the setup packet stored in the pipeline to a memory buffer and continues to process subsequent transactions.

* * * * *